Sept. 12, 1939.  J. MORKOSKI  2,172,985
IMPLEMENT
Filed June 3, 1938
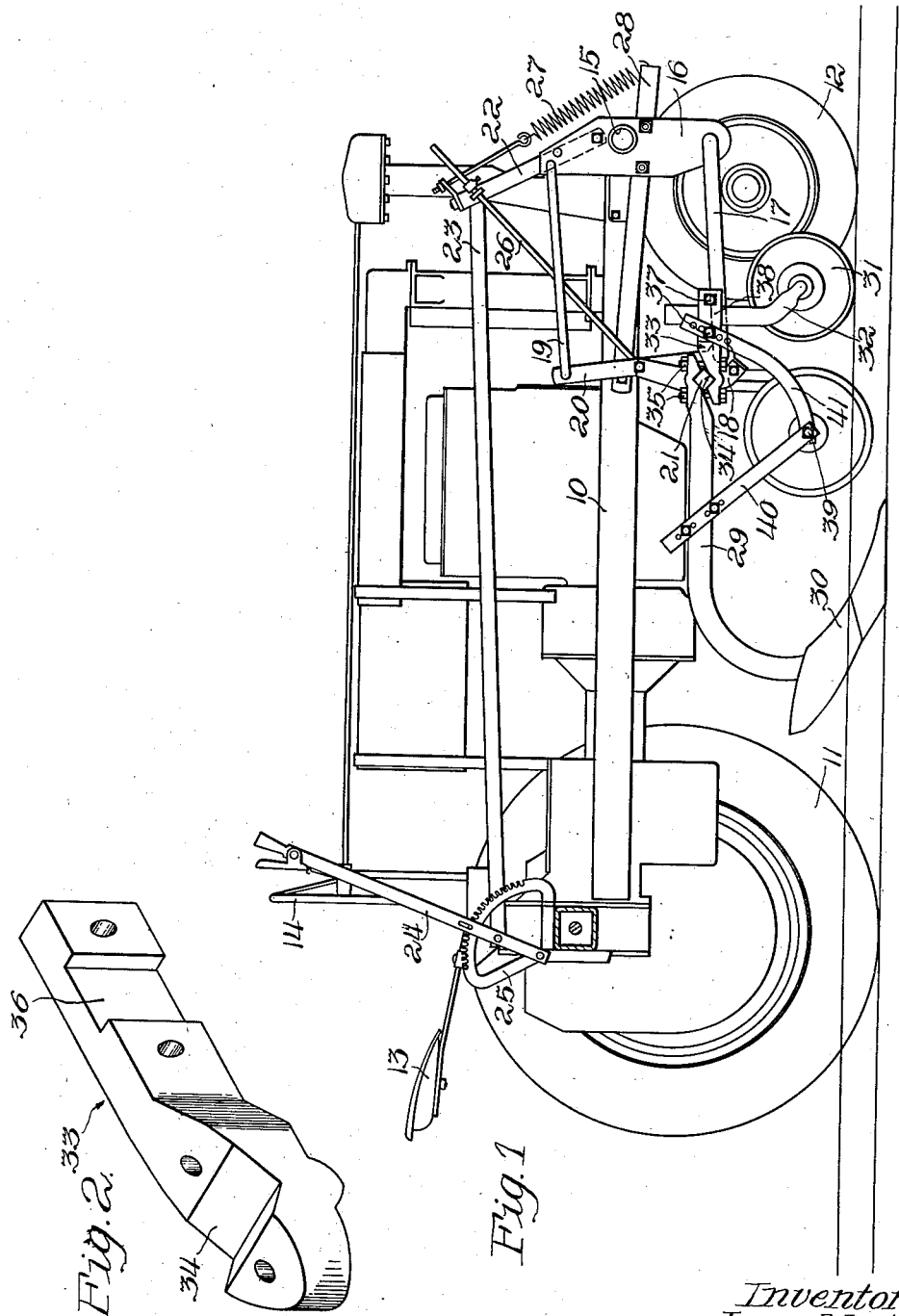
Inventor
James Morkoski
By V. T. Lamagne
Att'y.

Patented Sept. 12, 1939

2,172,985

UNITED STATES PATENT OFFICE 2,172,985

IMPLEMENT

James Morkoski, Canton, Ill., assignor to International Harvester Company, a corporation of New Jersey Application June 3, 1938, Serial No. 211,608

8 Claims. (Cl. 97—47)

This invention relates to an agricultural implement, and more particularly to that type of implement in which a pluraltiy of ground engaging elements is disposed on a tool bar.

The invention contemplates the provision of a unit assembly for certain parts of the implement and has for its principal object the provision of an improved means for attaching at least two ground engaging elements to the tool bar.

Another important object of the invention is to provide this mounting means in the form of a two-piece clamp, each part of which is a coextensive portion of the ground engaging elements.

Another important object, specifically, is to clamp one end of a beam of a plow or the like to an end of a supporting member of an additional ground engaging means with the tool bar rigidly disposed and clamped between said ends.

Still another object is to provide an improved clamping means embodying simple and sturdy construction; and Still another object is to form one portion of the clamping means in a manner permitting the same to be adjustably secured to a second ground engaging means, such as a gauge wheel, depth shoe, or the like.

Briefly and specifically, these and other desirable objects of the invention may be achieved in one preferred embodiment of the invention by providing one end of a plow beam with a portion adapted to engage a tool bar or like support and by forming one end of another member in a like manner, whereby the ends of said parts may be rigidly secured together to clamp the tool bar therebetween, the second member extending forwardly and being provided with means for clamping thereto the standard of a depth regulating means, such as a gauge wheel.

A more comprehensive understanding of the construction and advantages of the invention may be obtained from the following detailed description taken in conjunction with the accompanying sheet of drawing, wherein is disclosed one preferred form of the invention.

In the drawing:

Figure 1 is a side elevational view showing one type of agricultural implement disposed at the side of a tractor, the whole comprising a tractor mounted implement in which earth working or ground engaging elements are secured to a transverse tool bar by the means provided by the present invention; and, Figure 2 is a detailed perspective view of the forward portion of the clamping means to which a second ground engaging element may be secured.

While the present disclosure refers to a tractor mounted implement, it will be understood that the invention is equally well adapted to other types of implements and implement mountings. Figure 1, then, shows a tractor of the tricycle type having a narrow body portion 10 carried at its rear on a pair of rear traction wheels 11. The forward end of the body is supported on a steerable truck 12 which includes a pair of comparatively closely spaced wheels or one single wheel, as is well known to those skilled in the art. An operator's station 13 is provided at the rear of the tractor from which a steering wheel 14 is readily accessible to an operator for steering the front steerable truck.

Generally, the type of implement mounting disclosed comprises a transverse support 15 in the form of a pipe, or the like, secured to the tractor body. A plurality of supporting plates 16, only one of which is shown, is rigidly carried by the pipe 15, the number of these plates depending upon whether the implement is of a two or four row type. Since this element of construction is immaterial to the disclosure of the present invention, the remainder of the description will be directed to a single unit of the mounting. The plate 16 extends vertically above and below the pipe 15 and at its lower end has pivotally connected thereto a rearwardly extending draft link 17. This link at its rearward end is pivotally connected to a bracket structure 18 of any conventional construction. At its upper end, the plate 16 has pivotally connected thereto a rearwardly extending link 19 which at its rear end is pivotally connected to an upstanding arm 20 rigidly secured at its lower end to the bracket structure 18. This bracket structure, in any well known manner, carries rigidly therein a transverse tool bar 21. It will be understood that similar elements are disposed at the opposite side of the tractor and that the tool bar 21 is similarly related thereto.

In the present disclosure of a tractor mounted implement, lifting mechanism therefor is provided and includes an upstanding arm 22 pivotally associated with the plate 16. A rearwardly extending lift pipe 23 is pivotally connected at its forward end to the arm 22 and at its rear end to a lift lever 24, pivotally mounted on a quadrant 25. The quadrant 25 is secured to a rear portion of the tractor body 10, whereby the lift lever 24 may be easily reached from the operator's station 13. A lift link 26 is associated at its upper end with the upper end of the arm 22 and at its lower end is pivotally connected to the upstanding arm 20. It will thus far be seen that operation of the lift lever 24 will raise and lower the transverse tool bar 21. A helper spring 27 is connected between the upper end of the arm 22 and the forward end of a longitudinally extending member 28 rigidly carried by the plate 16.

In providing for the mounting of ground engaging elements on the tool bar 21, it is desirable that a simple and sturdy construction be utilized, and that superfluous parts be eliminated. For this purpose especially, the present invention has been designed, and a desirable clamping means has been provided for securing at least two ground engaging elements to the tool bar. One of these elements may be in the form of a plow or lister including a longitudinal rearwardly extending beam 29 which, at its rear end, carries a plow or lister bottom 30. The forward portion of the beam is notched or cut out horizontally to fit substantially one-half of the surface of the tool bar 21. The tool bar in the present disclosure is shown as being square in cross section, although any type of tool bar may be used. Another ground engaging element may be in the form of a gauge wheel 31 which is rotatably carried on the axle portion of a standard 32.

In order to secure the gauge wheel standard 32 rigidly to other portions of the construction, there has been provided, according to the present invention, a forwardly extending member 33 which at its rear end is notched or cut out horizontally, as at 34, to fit substantially the other half of the surface of the tool bar 21. The respective ends, then, of the beam 29 and the member 33 are arranged with their notched portions in opposed relation with the tool bar 21 disposed therebetween. Means in the form of bolts 35 secure the ends of the beam 29 and the member 33 together, clamping the same rigidly to the tool bar. In the present disclosure, since the tool bar 21 is square in cross section, the clamping means provided by the invention provides a desirable relation between the beam 29, the member 33 and the tool bar 21 whereby relative movement with respect to each other is prevented and a rigid and sturdy construction results.

The member 33, as previously mentioned, extends longitudinally forward substantially in alinement with the beam 29. The forward portion of the member is notched or cut out vertically, as at 36, for the purpose of receiving the shank portion of the gauge wheel standard 32. Clamping means in the form of a pair of bolts 37 and an auxiliary member 38 are provided for the purpose of adjustably clamping the standard to the member 33. Since a considerable portion of the weight of the implement is supported by the gauge wheel 31, it will be appreciated that the simple and rigid construction previously described is desirable.

The plow or lister beam 29 and the member 33 are adapted to carry additional ground engaging elements such as a coulter which is supported, as at 39, by a pair of members 40 and 41 secured to the parts 29 and 33, respectively. However, these may be otherwise attached.

It will be understood that only a preferred embodiment of the invention has been shown and described, and that numerous modifications and alterations may be made in the construction thereof without departing from the spirit and scope of the invention as defined in the appended claims.

What is claimed is:

1. An implement assembly comprising an implement beam provided at one end with a notched portion and carrying at its other end an earth working tool, a tool bar associated with the beam at its notched portion, a standard carrying member formed at one end with a notched portion, said member and the beam being arranged with the notched portions thereof in opposed relation substantially fitting the tool bar, means securing the member to the beam with the tool bar between the notched portions thereof for clamping said parts to the tool bar, said member being formed with a portion including clamping means for clamping thereto the standard of an auxiliary ground engaging member.

2. An implement assembly comprising an implement beam provided at one end with a notched portion and carrying at its other end an earth working tool, a tool bar associated with the beam at its notched portion, a standard carrying member formed at one end with a notched portion, said member and the beam being arranged with the notched portions thereof in opposed relation substantially fitting the tool bar, means securing the member to the beam with the tool bar between the notched portions thereof for clamping said parts to the tool bar, said member being formed with an integral portion cut out to substantially conform to the shank portion of a standard of an auxiliary ground engaging element, and means for clamping the standard to the member at the cut-out portion.

3. An implement assembly comprising an implement beam cut out horizontally at one end and carrying at its other end an earth working tool, a horizontal tool bar associated with the beam at its cut-out end, a standard carrying member cut out horizontally at one portion and cut out vertically at another portion, the member and the beam being disposed with the horizontal cut-outs in opposed relation with the tool bar therebetween, and clamping means for securing the tool bar, the beam and the member together, said member carrying in its vertical cut-out portion the vertical shank portion of a standard for an auxiliary ground engaging element.

4. A clamping means for securing at least two ground engaging elements to a transverse tool bar, comprising a member carrying one of the ground engaging means and including a portion cut out to fit substantially one-half of the tool bar, a second member carrying another ground engaging element and having a portion cut out to fit substantially the other half of the tool bar, and means securing said members together with the tool bar therebetween.

5. A clamping means for securing at least two ground engaging elements to a transverse tool bar, comprising a member carrying one of the ground engaging means and including a portion cut out to fit substantially one-half of the tool bar, a second member carrying another ground engaging element and having a portion cut out to fit substantially the other half of the tool bar, said second member having a second portion cut out to substantially fit a part of the second ground engaging element, means for securing said members together with the tool bar therebetween, and means cooperating with the second member at its second cut-out portion for securing thereto the said part of the second ground engaging element.

6. In a tractor mounted agricultural implement having a transverse tool bar, a clamping means for securing a plurality of ground engaging elements to the bar, comprising a beam extending longitudinally and rearwardly of the tractor and carrying at its rear end a ground engaging element, said beam being formed at its forward end with a portion notched horizontally to fit substantially one-half the surface of the tool bar, a member including a portion at its rear end notched horizontally to fit substantially the other half of the surface of the tool bar, said member extending longitudinally and forwardly from the tool bar and carrying a second ground engaging element, and means rigidly securing the beam and the member together with the tool bar therebetween.

7. In a tractor mounted agricultural implement having a transverse tool bar substantially square in cross section, a clamping means for securing a plurality of ground engaging elements to the bar, comprising a beam extending longitudinally and rearwardly of the tractor and carrying at its rear end a ground engaging element, said beam being formed at its forward end with a V notch substantially fitting one-half the surface of the tool bar, a member including a portion at its rear end formed with a V notch substantially fitting the other half of the surface of the tool bar, said member extending longitudinally and forwardly from the tool bar and carrying a second ground engaging element, and means rigidly securing the beam and the member together with the tool bar therebetween.

8. In a tractor mounted agricultural implement having a tool bar disposed transversely and for relative movement with respect to the tractor, a clamping means for securing a plurality of elements to the tool bar, at least one of the elements including means at one end for rigidly engaging the tool bar and at the other end having a ground engaging part, another of the elements including means at one end for rigidly engaging the tool bar and at the other end being connected to a supporting part of the implement.

JAMES MORKOSKI.